United States Patent [19]

Rankin et al.

[11] Patent Number: 5,455,939
[45] Date of Patent: Oct. 3, 1995

[54] METHOD AND APPARATUS FOR ERROR DETECTION AND CORRECTION OF DATA TRANSFERRED BETWEEN A CPU AND SYSTEM MEMORY

[75] Inventors: Linda J. Rankin, Beaverton; Mark A. Gonzales, Portland, both of Oreg.

[73] Assignee: Intel Corporation, Santa Clara, Calif.

[21] Appl. No.: 350,719

[22] Filed: Dec. 7, 1994

Related U.S. Application Data

[63] Continuation of Ser. No. 900,181, Jun. 17, 1992, abandoned.
[51] Int. Cl.⁶ ..................................................... G06F 11/34
[52] U.S. Cl. ........................... 395/182.04; 371/40.1; 371/40.4; 371/49.1; 364/285; 364/964.7; 364/965.4
[58] Field of Search ........................ 395/575, 200, 395/275, 325, 425, 775; 371/2.2, 10.1, 10.3, 13, 21.1, 40.1, 40.2, 40.4, 49.1; 364/285, 243, 243.1, 243.5, 964.7, 965.4

[56] References Cited

U.S. PATENT DOCUMENTS

| | | | |
|---|---|---|---|
| 4,466,055 | 8/1984 | Kinoshita et al. | 364/200 |
| 4,639,890 | 1/1987 | Heilveil et al. | 364/900 |
| 4,675,868 | 6/1987 | Shishikura et al. | 371/37.1 |
| 4,689,792 | 8/1987 | Traynor | 371/38.1 |
| 4,827,478 | 5/1989 | Chan | 371/38.1 |
| 4,852,100 | 7/1989 | Christensen et al. | 371/38.1 |
| 4,858,236 | 8/1989 | Ogasawara | 371/38.1 |
| 5,058,115 | 10/1991 | Blake et al. | 371/40.1 |
| 5,058,116 | 10/1991 | Chao et al. | 371/40.1 |
| 5,164,944 | 11/1992 | Benton et al. | 371/40.1 |
| 5,173,905 | 12/1992 | Parkinson et al. | 371/40.1 |
| 5,303,245 | 4/1994 | Shikakura et al. | 371/37.4 |
| 5,313,475 | 5/1994 | Cromer et al. | 371/40.1 |
| 5,369,650 | 11/1984 | Kirk et al. | 371/40.1 |

*Primary Examiner*—Robert W. Beausoliel, Jr.
*Assistant Examiner*—Dieu-Minh Le
*Attorney, Agent, or Firm*—Blakely, Sokoloff, Taylor & Zafman

[57] ABSTRACT

A method and apparatus for detecting and correcting errors in data transferred between a CPU and system memory. System memory typically has a number of dynamic random access memory (DRAM) devices that each have a block of memory cells. The DRAM also has an internal cache that contains a row of memory from a main memory block. Both the cache and block of memory cells contain vertical and horizontal parity bits. Each byte of data bits has an associated horizontal parity bit. Similarly a group of data bits having the same bit position will have an associated vertical parity bit. The parity bits are used to detect and correct errors in data transmissions between a CPU and system memory. The cache includes arrays of exclusive OR (XOR) gates that can update the vertical parity bits when one or more bytes of data are written into the DRAM.

2 Claims, 4 Drawing Sheets

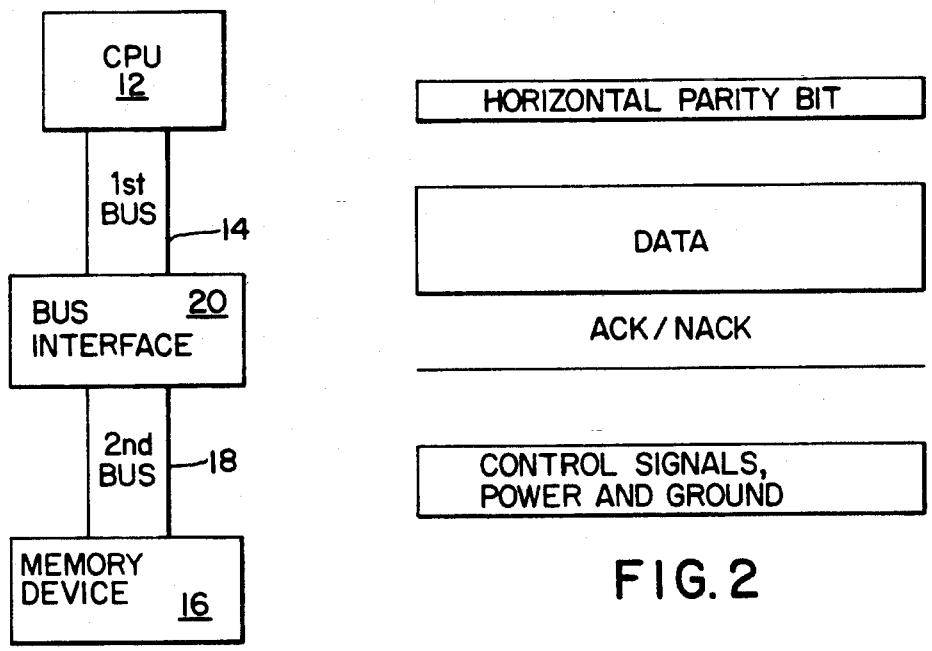
FIG. 1
FIG. 2
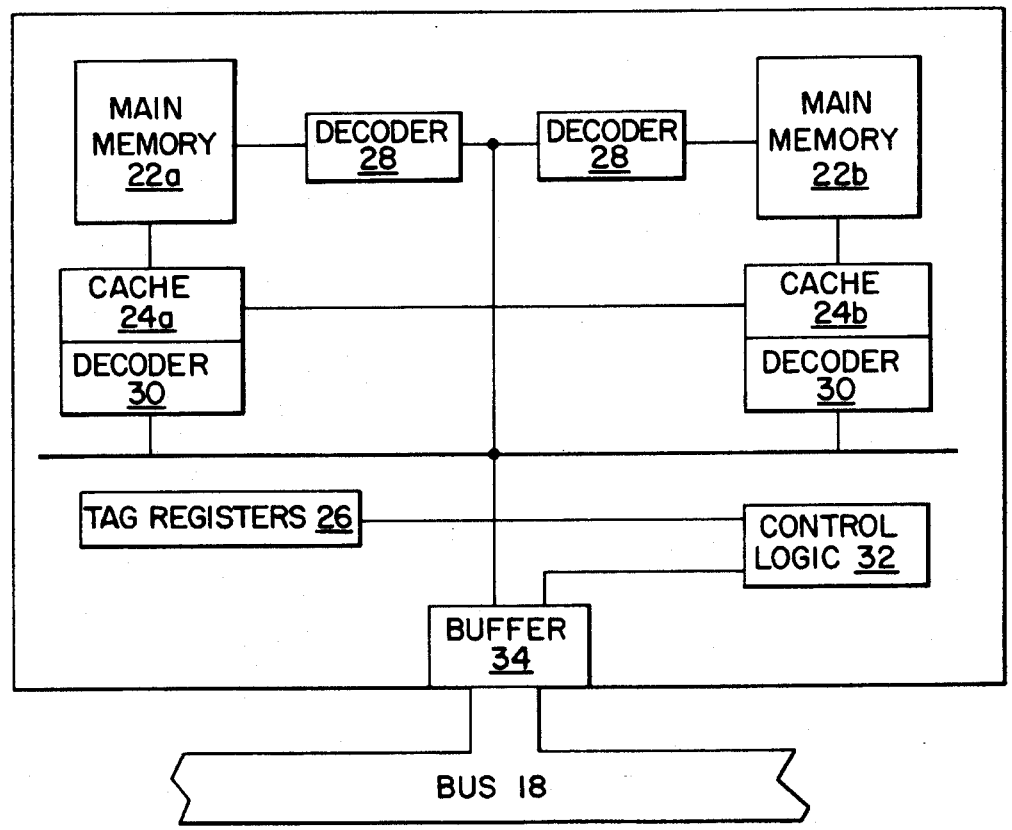
FIG. 3

METHOD AND APPARATUS FOR ERROR DETECTION AND CORRECTION OF DATA TRANSFERRED BETWEEN A CPU AND SYSTEM MEMORY

This is a continuation of application Ser. No. 07/900,181 filed Jun. 17, 1992.

BACKGROUND OF THE INVENTION

1. Field of the Invention

The present invention relates to error detection and correction of data transferred between a CPU and system memory.

2. Description of Related Art

Errors can occur during the transmission of digital signals because of defective devices, faulty transmission lines, etc. Such errors will typically invert the signal(s) such that the data bit(s) is changed from a binary 1 to a binary 0, or from a binary 0 to binary 1. The device reading the data does not know what the signal is supposed to be, it merely assumes the data is correct. If the device is a central processing unit (CPU), the reading of invalid data could produce an incorrect output. An invalid output can be fatal. For example, a CPU that processes money transactions or bank accounts must be very reliable. The creation of even one error in the data stream into the CPU could result in a $1.00 deposit being logged in as a $1,000,000.00 deposit. It is therefore becoming increasingly important to have a means of detecting and correcting errors in data transferred to a CPU.

Error correction codes (ECC) are presently employed in the read/write operations of disk drives, particularly hard disk drives which supply a large amount of data. The very nature of disk drives and the means for reading the disk are susceptible to errors in the data stream. Over the years a variety of ECC schemes have been used to detect and correct data errors. One such scheme is called a block code. In a block code the data is assembled into an array having x number of rows and n number of columns. The array also includes a column of horizontal parity bits and a row of vertical parity bits. The horizontal parity bits are set (given a binary 1 or 0), so that the summation of the horizontal parity bit and the data bits within a single row equal either a binary 0 (even parity) or a binary 1 (odd parity). If even parity is used, then the summation of the horizontal parity bit and data bits for each row will be a binary 0. Likewise, the summation of the vertical parity bit and data bits for each column must also equal 0. The vertical parity bits are therefore set so that the summations are always equal to 0.

Most disk drive controllers have logic means that add the data and horizontal parity bits of each row to determine if there is a horizontal parity error. The controller also adds the data and vertical parity bits of each column to determine if there is a vertical parity error. For each single bit error there will be an accompanying horizontal and vertical error detection. The exact location of the data error can be located by looking at the row and column that produced the horizontal and vertical parity errors. Once located, the invalid data bit can be inverted to the correct state. A block code ECC is somewhat slow, because such a scheme requires the accumulation of an entire array of data which must be analyzed before being sent to the system. Although error detection and correction decreases the data rate from the disk, disks are read relatively infrequently so that a reduction in speed does not slow down the system. Thus for disk drives, the increase in reliability is considered greater than the penalty from the reduction in the data rate.

Current architectures often use Hamming codes to provide error correction between system memory and the CPU. A Hamming code protects a block of data, typically 8 bytes or larger. To protect an 8 byte data block, 8 Hamming code bits are calculated, where each code bit is calculated as the parity of a different group of 16 bits out of the 8 bytes of data. Thus, each single data bit is used to calculate at least two Hamming code bits. The Hamming code bits are stored with the data that is written from the CPU. When data is read from memory back to the CPU, a new set of Hamming code bits are calculated and compared with the stored original Hamming code bits. When a single bit error occurs in receiving data, some of the newly calculated Hamming code bits for the received data will be different from the stored Hamming code bits, and these different bits can be used to identify and correct the erroneous bit. To perform the error detection and correction, the entire block of data again must be read into the CPU. This requirement greatly reduces the speed of the CPU to memory interfaces.

Present architectures typically incorporate a cache between the CPU and system memory. Most recently there has been developed a dynamic random access memory (DRAM) device that contains a cache line. Such a device is sold by Rambus, Inc. The present Rambus chip incorporates a horizontal parity bit but not a vertical parity bit. Although horizontal parity bits can be used to detect an error, the exact location of the error cannot be determined. Therefore there is no way to correct the invalid data bit. Typically a CPU that detects a horizontal error disregards that byte of data. The CPU must then resubmit a request for the same data which slows down the system. It would therefore be desirable to have a method and apparatus that provides error detection and correction between a CPU and system memory, without significantly decreasing the data rate of the bus. It would also be desirable to have a DRAM with a cache line that stores and upgrades parity bits for subsequent error detection and correction.

SUMMARY OF THE INVENTION

The present invention is a method and apparatus for detecting and correcting errors in data transferred between a CPU and system memory. System memory typically has a number of dynamic random access memory (DRAM) devices that each have a block of memory cells. The DRAM also has an internal cache that contains a row of memory from the main memory block. Both the cache and block of memory cells contain vertical and horizontal parity bits. Each byte of data bits has an associated horizontal parity bit. Similarly a group of data bits having the same bit position will have an associated vertical parity bit. The cache includes arrays of exclusive OR (XOR) gates that can update the vertical parity bits when one or more bytes of data are written into the DRAM.

When the CPU provides a read request to memory, the DRAM sends the data stored in cache. Each byte of data has an accompanying horizontal parity bit. The data bytes are followed by a vertical parity byte that contains the vertical parity bits. The CPU may have an interface that reads the data and parity bits from the memory device. The interface adds the data bits and horizontal parity bit of each byte to determine if there is an error in that byte of data. The interface also adds the data bits and vertical parity bit for each column of the data block, to determine if there is an error in any column of the data stream. If there is no horizontal error in a given byte, the interface allows the CPU to fetch that byte of data.

If a horizontal error is detected, the interface holds the invalid byte until all of the bytes are read and the vertical error is determined. The exact position of the invalid data bit within the byte is determined by the location of the vertical parity error. The invalid data can be corrected and the remaining data bytes can be sent to the CPU.

Therefore it is an object of this invention to provide a method for detecting and correcting errors in data transferred between a CPU and a memory device.

It is also an object of this invention to provide an apparatus that provides error detection and correction of data transferred between a CPU and a memory device without reducing the data rate.

It is also an object of this invention to provide a memory device that can generate and update vertical parity bits for an array of data bits.

It is also an object of this invention to provide a memory device that stores vertical parity bits, which does not significantly increase the size or complexity of the device.

It is also an object of this invention to provide a cache within a memory device that can generate, store and update vertical parity bits for an array of data bits.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a schematic of a system of the present invention.

FIG. 2 is a schematic showing the signals of a data bus;

FIG. 3 is a schematic of a DRAM cache with cache;

DETAILED DESCRIPTION OF THE INVENTION

Figure 4A:
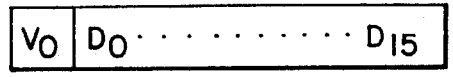
FIG. 4a is a schematic of a vertical parity bit slice which contains a vertical parity bit and a number of data bits.

Referring to the drawings more particularly by reference numbers, FIG. 1 is a schematic of a computer system 10 of the present invention. The system 10 has a central processing unit 12 (CPU) connected to a first bus 14, a memory device 16 connected to a second bus 18 and a bus interface 20 that couples the first and second busses. The first bus 14 is a typical CPU data bus that contains address/data lines, along with other additional control and power lines, as is known in the art. Although a second bus 18 and bus interface 20 are described and shown, it is to be understood that the present invention can be used without a bus interface or dual bus architecture.

FIG. 2 shows a preferred embodiment of the second bus 18. The bus 18 has 9 data lines, which allows a byte of data plus a horizontal parity bit to be transferred during each clock cycle. Addresses and data are transferred in serial byte form. Unless otherwise distinguished, data will include both instructions and data. The bus 18 also has an acknowledge line to allow the memory device to transmit an ACK or NACK signal, plus control, clock and power lines that allow data transmission between the bus interface 20 and the memory device 16.

FIG. 3 shows a preferred embodiment of the memory device 16. The memory device 16 is preferably a dynamic random access memory (DRAM) chip. A DRAM is preferred because of the high speed, large memory content characteristics of the device. The memory device 16 is preferably placed in close physical proximity to the processor 12. By placing the memory device 16 and processor 12 close together, a reliable very high speed bus 18 can be used, without errors due to line noise, etc.

The DRAM typically has two main memory blocks 22a and 22b each with 36×256×256 array of memory cells. A row from each main block is stored in each cache 24a and 24b. Each cache will have a approximately 1K bytes of memory. Such a memory device is presently produced by Rambus, Inc. The memory device has tag registers 26 to store the address of the rows within cache 24. The DRAM also has row 28 and column 30 decoders. The DRAM contains a logic circuit 32 to control the internal operation of the device and a buffer 34 to transfer data with the second bus in accordance with the second bus protocol. In the preferred embodiment, data is transferred on the second bus 500 Mbytes/sec.

CPU's usually request data several bytes at a time. For example, the processor may generate a read request for 16 bytes of information. The interface 20 will receive the read request and generate a request package. The request package typically includes the addresses requested by the CPU, device id (there are typically multiple DRAM devices on the second bus, the device id identifies which DRAM has the requested data), identification of the type of transaction (read or write) and the number of bytes being requested. The logic circuit 32 will then compare the addresses requested with the addresses within the tag registers 26 to determine whether the data is within cache. If a cache has the data, the logic circuit 32 will provide an ACK signal to the interface 20 and transfer the data to the buffer 34. The buffer 34 then sends the data onto the second bus 18 byte by byte.

If the cache does not have the requested data, the logic circuit 32 sends a NACK signal to the interface 20 and the requested address is retrieved from main memory 22 into cache 24. The interface 20 then resubmits the same request package, wherein the data is then retrieved from cache. Writing data from CPU 12 to memory 16 operates in a similar manner, with a request package being generated and sent by the interface 20. A CPU with write-back cache will typically write 16 bytes of data at a time. A CPU with write-through cache may write a single byte of data to memory. The present invention will operate with either type of CPU write format.

Figure 4B:
FIG. 4b is a schematic showing a bit slice which contains a number of vertical parity bit slices.
Figure 4C:
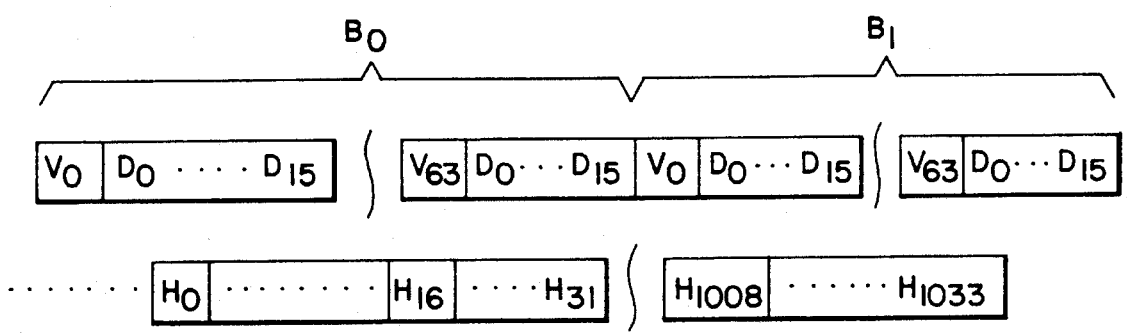
FIG. 4c is a schematic showing a DRAM cache line having a number bit slices and horizontal parity bits.

FIGS. 4a–c shows a memory array incorporating vertical and horizontal parity bits. Such an array could be found in the main memory blocks 22 of the DRAM. As shown in FIG. 4a, a vertical parity bit $V_0$ will be associated with a block of data $D_0-D_{15}$. For purposes of references only, each vertical parity bit and associated data will be referred to as a vertical parity slice. As shown in FIG. 4b, the vertical parity slices are grouped together into a bit slice, which typically contains 64 vertical parity slices ($V_0-V_{63}$). As shown in FIG. 4c, eight bit slices ($B_0-B_7$) are combined to create a DRAM line. The DRAM line also has a number of horizontal parity bits ($H_0-H_{1023}$) that are associated with each byte of data. When the DRAM cache performs a cache fetch from main memory, the DRAM line is then stored in cache.

Each data bit $D_0-D_{15}$ within a vertical parity slice of a bit slice has the same weight position within a data byte. For example, data bits $D_0-D_{15}$ for vertical parity bits $V_0-V_{63}$ of the first bit slice $B_0$ may be the least significant bit (LSB). The data bits $D_0-D_{15}$ of vertical bits $V_0-V_{63}$ of the last bit slice $B_7$ may be the most significant bit (MSB), and so forth and so on. To read/write the data of the cache, the memory cells containing the associated data bits $V_iD_i$ of each bit slice are enabled. For example, to write one byte of data into cache, the memory cell associated with $V_0D_0$ of the first bit slice $B_0$ may be enabled with the memory cell of $V_0D_0$ of the second-slice $B_1$, along with the data bits $V_0D_0$ of the remaining bit slices $B_{2-7}$. As will be discussed, a horizontal parity bit is also sent with the byte of data. The horizontal parity bit would be stored in the memory cell associated with the horizontal parity bit $H_0$. There is a horizontal parity bit associated for each byte of $V_iD_i$ data bits. For instance the data of bits $V_0D_0$ ($B_0-B_7$) for the DRAM line have a horizontal parity bit $H_0$, the data bits $V_{63}D_{15}$ ($B_0-B_7$) have an associated horizontal parity bit $H_{1023}$ and so forth and so on.

The value of the vertical parity bit will be such that the summation of the data bits within a vertical parity slice ($D_0-D_{15}$), added to the vertical parity bit $V_0$, is equal to a predetermined number. The number being either a binary 1 (odd parity) or a binary 0 (even parity). For example, if an even parity scheme is used and the summation of data bits in a single column is a binary 1, then the vertical parity bit would be set to a binary 1, so that the addition of the vertical parity bit to the sum of the data bits equals 0. Likewise, the horizontal parity bit is set so that the summation of the data bits and horizontal parity bit for a single byte is equal to the predetermined number (0 or 1).

Figure 5:
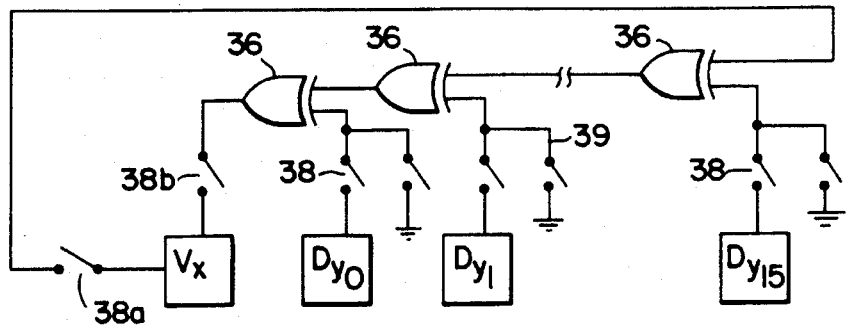
FIG. 5 is a schematic of an XOR gate array connected to the cache of a DRAM.
Figure 5A:
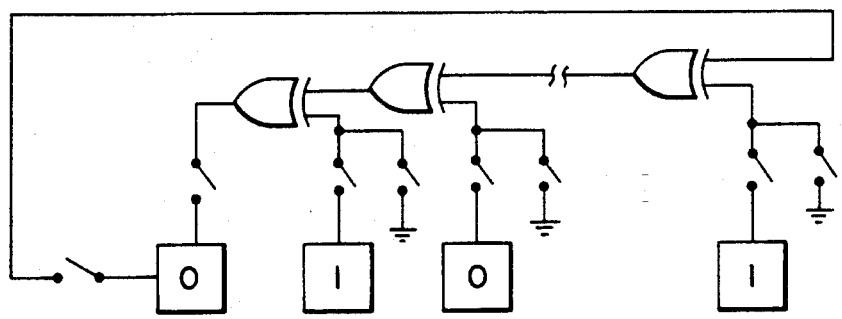
FIG. 5a is a schematic of the XOR gate of FIG. 5 having four data bits and an accompanying vertical parity bit.

FIG. 5 shows a preferred embodiment for generating and updating vertical parity bits within the cache of a DRAM. The DRAM has an array of exclusive OR (XOR) gates 36 attached to the memory cells of the cache. Each vertical parity slice has a series of XOR gates that are coupled to the data cells $D_0-D_{15}$ and the vertical parity bit $V_0$. Each cell is connected to an exclusive OR (XOR) gate 36 through a switch 38. The XOR gates 36 are also coupled to ground through switch 39. The output of each XOR gate is provided as an input to another XOR gate that is connected to the next cell in the vertical parity slice. The vertical parity bit cell is connected to the first and last XOR gates through switches 38a and 38b. The switches 38 of the XOR gates are connected to the column decoder of the DRAM. When the decoder enables a column within the cache, the switches are closed.

When new data is written into cache, the memory cells that are to receive the write data are enabled. The enabled cells containing the old data are XORed (added) with the original vertical parity bit and a new intermediate vertical parity bit is stored in the vertical parity cell ($V_0$). The new data is then written into the memory cells and the new data is XORed with the intermediate vertical parity bit to create an updated vertical parity bit.

Figure 5B:
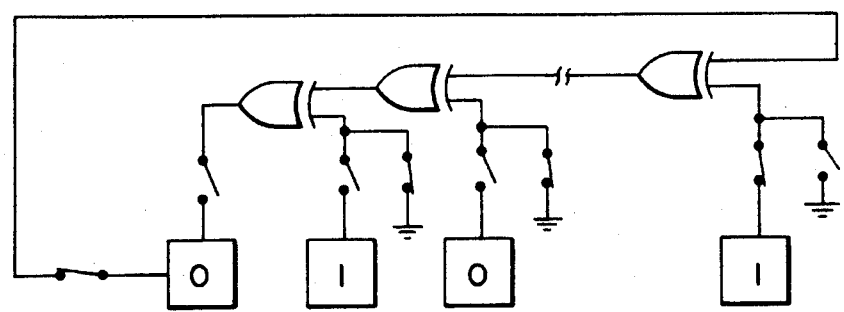
FIG. 5b is a schematic similar to FIG. 5a showing the closing of switches within the XOR gate array.
Figure 5C:
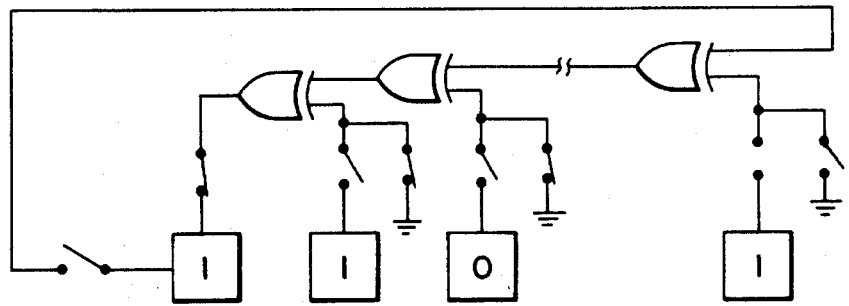
FIG. 5c is a schematic similar to FIG. 5a showing an intermediate vertical parity bit.

For example, referring to FIGS. 5a–d, a vertical parity slice of memory cells may contain the binary numbers 10 . . . 1. Even parity will be employed, wherein the vertical parity bit is set to a binary 0. A write will be initiated that will change memory cell $D_{15}$ from a binary 1 to a binary 0. As shown in FIG. 5b, the switches 38 and 38a of the last data bit ($D_{15}$) and the vertical parity bit ($V_0$) are closed. The switches 39 of the remaining data bits are also closed coupling the corresponding XOR gates to ground, so that there is provided a binary 0 as an input to the XOR gates. The result is an XORing (adding) of the vertical parity bit and the last data bit ($D_{15}$), which generates an intermediate parity bit. As shown in FIG. 5c, the switches 38a and 38b are opened and closed, respectively. The intermediate parity bit is latched into the vertical parity bit memory cell $V_0$.

Figure 5D:
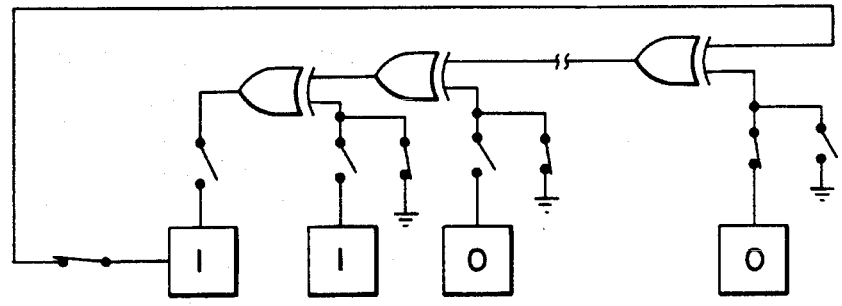
FIG. 5d is a schematic similar to FIG. 5b showing an updated vertical parity bit.

As shown in FIG. 5d, the new data value is then stored in the last data cell $D_{15}$. The switches are closed and the new data value is XORed (added) with the intermediate parity bit to produce an updated vertical parity bit, which is then latched into the vertical parity bit memory cell ($V_0$), after the switches 38 and 38a are closed and opened, respectively. This process is followed for each vertical parity slice that receives new data. For each byte of data written into cache, there are 8 vertical parity bits that are updated.

The new parity bit is generated no matter how many new bytes of data are written into the array. The scheme works whether one new byte is written or x number of bytes are written. When the CPU writes into the cache of the DRAM, the DRAM updates the vertical parity bit, so that if the CPU subsequently reads the cache line, the correct vertical parity bit is in place for the requested data. This embodiment is particularly valuable for a CPU that has write through cache, which may write less than the full 16 byte block (ie. 1–4 byte writes) described above. The horizontal parity bits are preferably not updated so that an error in transmission between the CPU and memory device can still be subsequently detected by the CPU.

Figure 6:
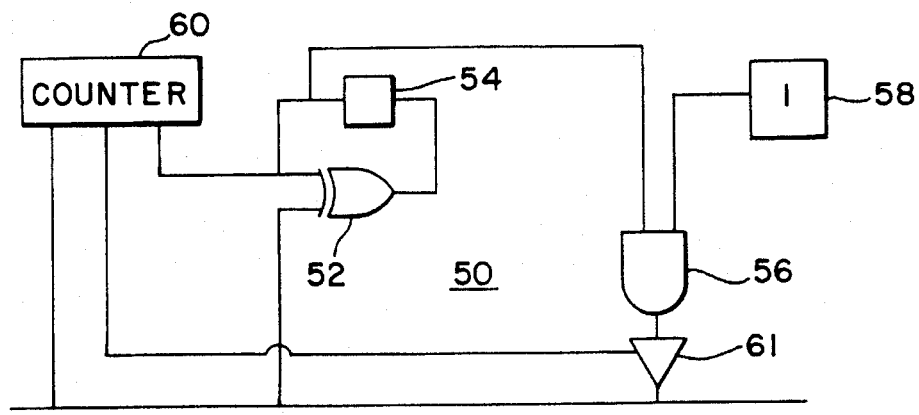
FIG. 6 is a schematic of a bus interface that generates vertical parity bits.

The bus interface 20 may also have means for generating a vertical parity bit. FIG. 6 shows a schematic of a vertical parity circuit 50 to generate the vertical parity bits. Each line on the second bus has a vertical parity circuit 50 connected thereto, such that there is generated a vertical parity bit for each data line on the second bus 18. The circuit has an XOR gate 52 with one input connected to the data bus and the other input connected to its own output through a latch 54. The gate continuously adds the data bits transmitted across the bus from the CPU 12. The output of the latch 54 provides an input to an AND gate 56. The other input to the AND gate is connected to a register 58 which contains a binary valve that is dependent upon the type of parity (odd or even) being employed. If an even parity scheme is used the register will contain a binary 1. The AND gate 56 AND's the added data values with the stored value.

A counter 60 is attached to the bus and the enable pin of a tristate buffer 61. The counter 60 is also connected to the XOR gate 52, to provide an input (binary 0) to the gate for the first data bit on the bus. The counter 60 counts the number of bits that are sequentially transmitted across the bus. When the counter 60 reaches a predetermined number, the tristate buffer 61 is enabled and the output of the AND gate 56 is provided to the bus. Thus if 16bytes of data are transmitted to memory, the counter 60 counts each byte while the XOR gate 52 is adding the data, bit by bit. When the counter 60 reaches 16, the tristate buffer 61 is enabled and the output of the AND gate 56 (which is the summation of all of the data bits on the bus added to the stored value in the register 58) provides a vertical parity bit that is sent to the bus. If the final output of the latch 54 is a binary 1, then the AND gate 56 will provide a vertical parity bit having a binary 1. When the vertical parity bit is added to the summation of the data bits the sum will be a binary 0, thereby conforming with the even parity scheme. If the XOR outputs a 0, the vertical parity bit will be a 0. Either the CPU 12 or the interface 20 can also generate a horizontal parity bit for each byte of data.

The interface 20 will typically write a block of data to memory. The data block may contain 16 bytes of data plus a horizontal parity bit for each byte. The block may also contain an additional vertical parity generated by the interface. The block of data and parity bits are then stored in the cache of the DRAM and then possibly into the memory blocks of the memory device.

Figure 7:
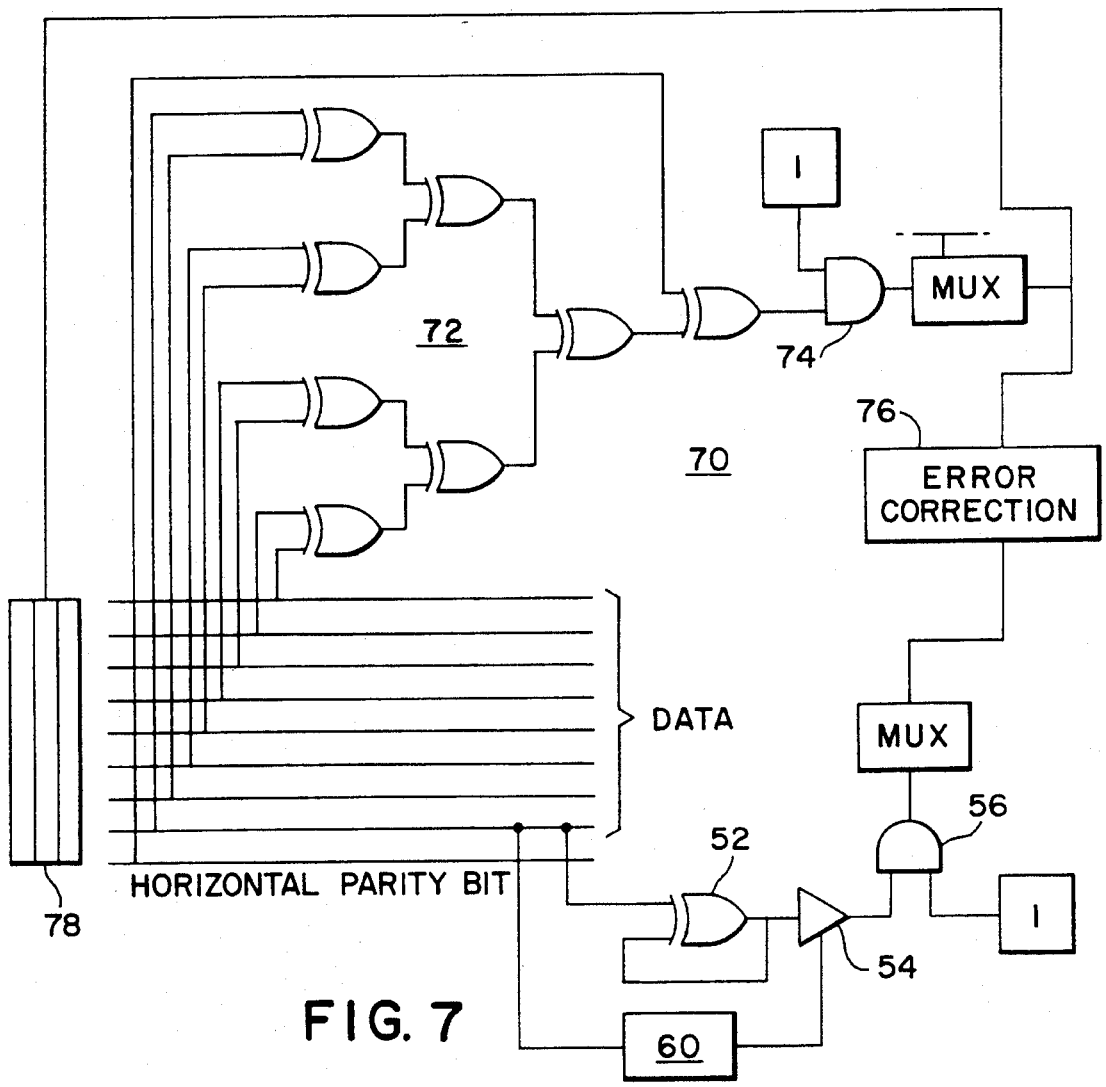
FIG. 7 is a schematic of a bus interface that detects parity errors.

When the CPU generates a read request, the memory device supplies the data requested (typically in a 16 byte burst), plus the horizontal and vertical parity bits. The interface 20 may have means to detect any errors in the data on the second bus. FIG. 7 shows a schematic of a circuit 70 that can detect and correct errors in the data stream. As each byte of data enters the bus interface 20, the data bits of each byte are added by the XOR gate array 72 shown. The sum of the bits are added with the horizontal parity bit and the result is provided to an AND gate 74. The other input to the AND gate 74 is a stored value, which is a binary 1 for an even parity scheme. The output of the AND gate 74 is provided to an error correction circuit 76 and to the enable/disable pin of the registers within an interface buffer 78. If an error is detected, the registers 78 are disabled so that the invalid byte cannot be fetched by the CPU 12. The circuit 70 is therefore capable of detecting a horizontal error. The same circuit can also be used to generate the horizontal parity bits, by providing the output of the AND gate 74 to the horizontal parity bit lien of the bus.

The vertical parity circuit shown and described in FIG. 6 can also be used to detect vertical parity error for each column in the data stream. The summation of data bits within a column are added to the vertical parity bit and provided to the AND gate 56. The output of the AND gate 56 is provided to the error correction circuit 76. The AND gate 56 of the vertical parity check circuit and the AND gate 74 of the horizontal parity check circuit can be multiplexed, such that the output of the AND gates are routed to the bus when parity bits are being generated, or routed to the error correction circuit 76 when error detection is desired. The error correction circuit 76 may have a pair of shift registers that store the output of the AND gates 56 and 74.

As each byte of the data package arrives from the memory device 16 20 to the interface, the interface 20 checks for a horizontal error and stores the byte of data in the interface buffer 78. If no error is detected, then the buffer 78 is enabled and the valid byte can be fetched by the CPU 12. If a horizontal error is detected, the registers in the buffer 78 containing the invalid byte are disabled. The buffer 78 continues to store the remaining bytes of information. After the vertical parity byte is read by the memory interface, the summation of data and vertical parity bits are provided by the AND gates 56 of the vertical parity circuits and stored in registers within the error correction circuit 76. The error correction circuit 76 contains inverter circuits connected to the registers within the buffer 78. If a vertical parity error register contains a binary 1, then the buffer register connected to that error register will have its contents inverted. In this manner, the invalid data bit is inverted to the correct value. The buffer registers 78 are then enabled so that the data can be fetched by the CPU 12.

The interface error detection and correction circuits can be used with or without the XOR gate array in the DRAM cache. If the XOR gate array is not used, the interface and/or CPU will generate the vertical and horizontal parity bits which would be stored without modification in the DRAM cache and memory blocks. Any errors in the transmission or storage of the data would be detected by the interface upon retrieval from memory. The vertical parity bits would typically be generated by the interface 20 when the CPU provides a write burst (16 byte block). The interface parity generator circuit would typically not be implemented when the CPU has write through cache (1–4 byte writes).

Although the present error correction code (ECC) will typically detect a single error within a block of data, the present ECC scheme will also detect multiple errors if the errors are within different bytes and have different positions within the bytes. For example, in a 16 byte block of data, the present invention can detect and correct an error in the most significant bit (MSB) of the first byte and the least significant bit (LSB) of the second byte.

While certain exemplary embodiments have been described in detail and shown in the accompanying drawings, it is to be understood that such embodiments are merely illustrative of and not restrictive on the present invention and that the invention not be limited to the specific arrangements and constructions shown and described, since various other modifications may occur to those ordinarily skilled in the art.

What is claimed is:

1. A method of writing data onto a memory device, comprising the steps of:

a) providing:

main memory means for providing a plurality of memory cells;

cache means operatively connected to said main memory means for storing data from said main memory means, said cache means having an array of memory cells containing data bits and at least one horizontal parity bit, each horizontal parity bit being associated with a byte of data, said memory cells further containing a plurality of vertical parity bits, each vertical parity bit being associated with data bits having a same bit position;

a vertical parity circuit that has arrays of XOR gate connected to said memory cells, each array of XOR gates being connected to memory cells containing a vertical parity bit and data bits having a same bit position, said array of XOR gates including a first XOR gate, a last XOR gate and a plurality of intermediate XOR gates, said first, last and intermediate XOR gates each having a first input coupled to a corresponding memory cell by a first switch and coupled to ground by a second switch, said first and intermediate XOR gates each having a second input connected to an output of a preceding XOR gate, said first XOR gate having an output coupled to a memory cell containing said vertical parity bit by a first switch, said last XOR gate having a second input coupled to said memory cell containing said vertical parity bit by a first switch;

b) closing said first switches of a predetermined number of memory cells containing said data bits and said vertical parity bits, including said first switch coupling said second inputs of said last XOR gates with said data memory cells containing said vertical parity bits;

c) closing said second switches of said remaining memory cells containing said data bits;

d) adding said data bits and said corresponding vertical parity bits of each bit position to generate an intermediate vertical parity bit for each bit position;

e) opening said first switches that couple said second inputs of said last XOR gates with said memory cells containing said vertical parity bits;

f) closing said first switches that couple said outputs of said first XOR gates with said memory cells containing said vertical parity bits;

g) storing said intermediate parity bits in said memory cells previously containing said vertical parity bits;

h) closing said first switches that couple said second inputs of said last XOR gates with said memory cells containing said intermediate vertical parity bits;

i) opening said first switches that couple said outputs of said first XOR gates with said memory cells containing said vertical parity bits;

j) writing data into said memory cells with said first switches closed;

k) adding said data bits and said corresponding intermediate vertical parity bits of each bit position to generate updated vertical parity bits for each bit position;

l) opening said first switches that couple said second inputs of said last XOR gates with said memory cells containing said vertical parity bits;

m) closing said first switches that couple said outputs of said first XOR gates with said memory cells containing said vertical parity bits; and n) storing said updated vertical parity bits in said memory cells previously containing said intermediate vertical parity bits.

2. A method of transferring data within a computer system, comprising the steps of:

a) providing;

a central processing unit (CPU) that can write data;

a bus connected to said CPU;

a memory device connected to said bus, said memory device having main memory means for providing a plurality of memory cells, cache means operatively connected to said main memory means for storing data from said main memory means, said cache means having an array of memory cells containing data bits and at least one horizontal parity bit, each horizontal parity bit being associated with a byte of data, said memory cells further containing a plurality of vertical parity bits, each vertical parity bit being associated with data bits having a same bit position, a vertical parity circuit that has arrays of XOR gate connected to said memory cells, each array of XOR gates being connected to memory cells containing a vertical parity bit and data bits having the same bit position, said array of XOR gates including a first XOR gate, a last XOR gate and a plurality of intermediate XOR gates, said first, last and intermediate XOR gates each having a first input coupled to a corresponding memory cell by a first switch and coupled to ground by a second switch, said first and intermediate XOR gates each having a second input connected to an output of a preceding XOR gate, said first XOR gate having an output coupled to a memory cell containing said vertical parity bit by a first switch, said last XOR gate having a second input coupled to said memory cell containing said vertical parity bit by a first switch;

bus interface means connected to said bus and said CPU for transferring a block of data bits on a bus, said block of data bits including horizontal and vertical parity bits, said bus interface means providing a horizontal sum by adding said horizontal parity bit and said bits of each data byte and comparing said horizontal sum to a first predetermined value to determine if an horizontal error exist in said data byte, said bus interface means further provides a vertical sum for each column of said data bytes by adding said vertical parity bit and said data bits within said column, said bus interface means compares said vertical sum of each column with a second predetermined value to determine if a vertical error exist;

b) closing said first switches of a predetermined number of memory cells containing said data bits and said vertical parity bits, including said first switch coupling said second inputs of said last XOR gates with said data memory cells containing said vertical parity bits;

c) closing said second switches of said remaining memory cells containing said data bits;

d) adding said data bits and said corresponding vertical parity bits of each bit position to generate an intermediate vertical parity bit for each bit position;

e) opening said first switches that couple said second inputs of said last XOR gates with said memory cells containing said vertical parity bits;

f) closing said first switches that couple said outputs of said first XOR gates with said memory cells containing said vertical parity bits;

g) storing said intermediate parity bits in said memory cells previously containing said vertical parity bits;

h) closing said first switches that couple said second inputs of said last XOR gates with said memory cells containing said intermediate vertical parity bits;

i) opening said first switches that couple said outputs of said first XOR gates with said memory cells containing said vertical parity bits;

j) writing data into said memory cells with said first switches closed;

k) adding said data bits and said corresponding intermediate vertical parity bits of each bit position to generate updated vertical parity bit for each bit position;

l) opening said first switches that couple said second inputs of said last XOR gates with said memory cells containing said vertical parity bits;

m) closing said first switches that couple said outputs of said first XOR gates with said memory cells containing said vertical parity bits;

n) storing said updated vertical parity bits in said memory cells previously containing said intermediate vertical parity bits;

o) sending data from said memory device to said bus interface means, said data including a vertical parity byte and horizontal parity bits for each byte of data;

p) adding said data bits of each data byte with said corresponding horizontal parity bit to determine if there is a horizontal parity error; and, q) adding said data bits with said corresponding vertical parity bit of each column to determine if there is a vertical parity error.

* * * * *